United States Patent
Jeon et al.

(10) Patent No.: US 10,295,862 B2
(45) Date of Patent: May 21, 2019

(54) LIQUID CRYSTAL DISPLAY AND MANUFACTURING METHOD THEREOF

(71) Applicant: SAMSUNG DISPLAY CO., LTD., Yongin, Gyeonggi-Do (KR)

(72) Inventors: Jae-Hwan Jeon, Asan-si (KR); Sang Hwan Lee, Asan-si (KR); Ki Seok Cha, Yongin-si (KR)

(73) Assignee: SAMSUNG DISPLAY CO., LTD., Yongin, Gyeonggi-Do (KR)

( * ) Notice: Subject to any disclaimer, the term of this patent is extended or adjusted under 35 U.S.C. 154(b) by 128 days.

(21) Appl. No.: 14/812,301

(22) Filed: Jul. 29, 2015

(65) Prior Publication Data

US 2016/0238896 A1  Aug. 18, 2016

(30) Foreign Application Priority Data

Feb. 13, 2015 (KR) .................. 10-2015-0022528

(51) Int. Cl.
  *G02F 1/1345* (2006.01)
  *G02F 1/1335* (2006.01)

(52) U.S. Cl.
  CPC .... *G02F 1/133608* (2013.01); *G02F 1/13454* (2013.01); *G02F 1/133528* (2013.01)

(58) Field of Classification Search
  CPC ........ G02F 2001/133314; G02F 2001/133317; G02F 1/133608; G02F 2201/121; G02F 2201/50; G02F 1/133305; G02F 1/13471; G02F 1/13452; G09G 2300/0408; G06F 1/1637; G02B 6/0083; H05K 1/00
  See application file for complete search history.

(56) References Cited

U.S. PATENT DOCUMENTS

| | | | | |
|---|---|---|---|---|
| 6,074,729 A | * | 6/2000 | Watanabe | G02B 5/3033 428/212 |
| 7,965,349 B2 | * | 6/2011 | Oohira | G02B 6/0073 349/158 |
| 2006/0068308 A1 | * | 3/2006 | Ohshima | G03G 5/0542 430/59.6 |
| 2008/0284956 A1 | * | 11/2008 | Wang | G02F 1/1336 349/113 |

(Continued)

FOREIGN PATENT DOCUMENTS

| KR | 1020120061486 | 6/2012 |
|---|---|---|
| KR | 1020130117428 | 10/2013 |

(Continued)

*Primary Examiner* — Angela K Davison
*Assistant Examiner* — Jonathan Y Jung
(74) *Attorney, Agent, or Firm* — F. Chau & Associates, LLC

(57) ABSTRACT

A liquid crystal display includes a first display panel and a second display panel facing each other, a driver connecting line disposed on the first display panel, a driving circuit part connected to the driver connecting line, a backlight unit disposed adjacent to the first display panel, a reinforcing part overlapping the driver connecting line and disposed adjacent to at least one side of the second display panel, a second polarizer disposed on the second display panel, and a film layer disposed on the second polarizer and the reinforcing part. The second polarizer overlaps a top surface of the second display panel and does not overlap a top surface of the reinforcing part.

20 Claims, 12 Drawing Sheets

(56) References Cited

U.S. PATENT DOCUMENTS

| | | | | |
|---|---|---|---|---|
| 2009/0262277 A1* | 10/2009 | Kim | ............ | G02F 1/133308 |
| | | | | 349/58 |
| 2013/0088818 A1* | 4/2013 | Yamaguchi | ............ | H05K 5/03 |
| | | | | 361/679.01 |
| 2014/0120275 A1* | 5/2014 | Lu | ............ | G02F 1/133308 |
| | | | | 428/34.1 |

FOREIGN PATENT DOCUMENTS

| | | | | |
|---|---|---|---|---|
| KR | 2014/0058106 A | * | 5/2014 |
| KR | 20140058106 A | * | 5/2014 |
| KR | 1020140058106 | | 5/2014 |

\* cited by examiner

US 10,295,862 B2

LIQUID CRYSTAL DISPLAY AND MANUFACTURING METHOD THEREOF

CROSS-REFERENCE TO RELATED APPLICATIONS

This application claims priority under 35 U.S.C. § 119 to Korean Patent Application No. 10-2015-0022528, filed on Feb. 13, 2015, in the Korean Intellectual Property Office, the contents of which are incorporated by reference herein in their entirety.

TECHNICAL FIELD

The present invention relates to a liquid crystal display and a manufacturing method thereof.

DISCUSSION OF THE RELATED ART

A liquid crystal display, which is one of the most commonly used types of flat panel displays, includes two display units with electric field generating electrodes such as a pixel electrode and a common electrode. A liquid crystal layer may be interposed between the pixel electrode and the common electrode. The liquid crystal display generates an electric field in the liquid crystal layer by applying a voltage to the electric field generating electrodes. The electric field generated by the voltage applied to the electric field generating electrodes may change the direction of liquid crystal molecules of the liquid crystal layer. Thus, the liquid crystal display may control polarization of incident light and may display images.

Since the liquid crystal display is not a self-emission display device, a backlight for supplying light to the liquid crystal layer is utilized.

The liquid crystal display may be assembled by supporting a backlight assembly on a bottom chassis, mounting a liquid crystal panel on the backlight assembly, coupling the liquid crystal panel and the backlight assembly with each other using a top chassis, and attaching reinforced glass on an upper surface of the top chassis using an adhesive. In this case, the top chassis may have an upper surface covering an edge of the liquid crystal panel.

Recent demand for large liquid crystal displays having a small thickness has increased. A bezel area of the liquid crystal display may be defined by the bottom chassis and the top chassis and may be located at the edges of the liquid crystal panel. The bezel area of the liquid crystal display may be narrow (e.g., small). Alternatively, the bottom chassis and the top chassis may be omitted and the liquid crystal display may be configured to hide the bezel area from a user.

A portion of a substrate without a driving connection line of the two substrates facing each other may be partially removed at an edge portion with the driving connection line to expose the driving connection line. The driving connection line may be connected to an external driving circuit portion to transfer a driving signal to the liquid crystal panel. A height difference between the two substrates may be caused by the partial removal of one of the two substrates (e.g., to expose the driving connection line). The height difference between the two substrates may be compensated by a chassis.

SUMMARY

Exemplary embodiments of the present invention have been made in an effort to provide a liquid crystal display and a manufacturing method thereof that prevent a bezel portion from being viewed by a user at four edges of a liquid crystal panel by omitting a chassis part even at the portion corresponding to the edge with the driving connection line connecting an external driving circuit portion and a liquid crystal panel.

Exemplary embodiments of the present invention have also been made in an effort to provide a liquid crystal display and a manufacturing method thereof that reduce manufacturing costs by simplifying a manufacturing process.

According to an exemplary embodiment, a liquid crystal display includes a first display panel and a second display panel facing each other, a driver connecting line disposed on the first display panel, a driving circuit part connected to the driver connecting line, a backlight unit disposed adjacent to the first display panel, a reinforcing part overlapping the driver connecting line and disposed adjacent to at least one side of the second display panel, and a second polarizer disposed on the second display panel. The second polarizer overlaps a top surface of the second display panel and does not overlap a top surface of the reinforcing part. The liquid crystal display further includes a film layer disposed on the second polarizer and the reinforcing part.

In an exemplary embodiment, a portion of the driver connecting line does not overlap the second display panel, and the reinforcing part overlaps the driver connecting line.

In an exemplary embodiment, a surface height of the reinforcing part and a surface height of the second polarizer are substantially equal to each other.

In an exemplary embodiment, the backlight unit includes a backlight assembly and a mold frame supporting the backlight assembly. A chassis is not disposed between the backlight unit and the first display panel.

In an exemplary embodiment, the second polarizer overlaps with the surface of the second display panel and does not overlap with the reinforcing part.

In an exemplary embodiment, the reinforcing part includes an elastic material.

According to an exemplary embodiment, a manufacturing method of a liquid crystal display includes forming a first display panel and a second display panel facing the first display panel. Forming the first display panel includes disposing a signal line on a pixel region of the first display panel, connecting a driver connecting line to the signal line, and connecting a driving circuit part to the driver connecting line. The method further includes forming a first polarizer on a first surface of the first display panel and a second polarizer on a second surface of the second display panel, adhering the first display panel and a backlight unit to each other, forming a reinforcing part to overlap with the driver connecting line, the reinforcing part being adjacent to at least one side of the second display panel, and forming a film layer on the second polarizer and the reinforcing part.

In an exemplary embodiment, a portion of the driver connecting line does not overlap with the second display panel, and the reinforcing part overlaps with the driver connecting line.

In an exemplary embodiment, a surface height of the reinforcing part and a surface height of the second polarizer are substantially equal to each other.

In an exemplary embodiment, the second polarizer overlaps the second surface of the second display panel and does not overlap a top surface of the reinforcing part.

In an exemplary embodiment, the reinforcing part includes an elastic material.

According to an exemplary embodiment, a liquid crystal display includes a first panel and a second panel facing the first panel, a first polarizer disposed on the first panel, a second polarizer disposed on the second panel, a reinforcing part disposed on the first panel, the reinforcing part not overlapping with the second polarizer, a driver connecting line disposed on the first panel, the driver connecting line overlapping with the reinforcing part, a driving circuit part connected with the driver connecting line, a backlight unit disposed on the first panel, and a film layer disposed on the second polarizer.

In an exemplary embodiment, the reinforcing part includes polyethylene (PET).

In an exemplary embodiment, a thickness of the reinforcing part is about 0.5 mm to about 0.7 mm.

In an exemplary embodiment, a first width of the second panel along a first direction is smaller than a first width of the first panel along the first direction, and a second width of the second panel along a second direction crossing the first direction is substantially equal to a second width of the first panel along the second direction.

In an exemplary embodiment, the reinforcing part includes an elastic material.

In an exemplary embodiment, a first height of a top surface of the reinforcing part is substantially equal to a second height of a top surface of the second polarizer.

In an exemplary embodiment, the backlight unit is fastened to the first panel via an adhesive part, and the first polarizer does not overlap with the adhesive part.

In an exemplary embodiment, the film layer overlaps with the reinforcing part and the second polarizer.

In an exemplary embodiment, the film layer hides a step between the reinforcing part and the second polarizer.

According to exemplary embodiments of the present invention, it is possible to prevent a bezel portion from being viewed by a user at four edges of a liquid crystal panel by omitting a chassis part even at the portion corresponding to the edge with the driving connection line connecting an external driving circuit portion and a liquid crystal panel.

According to exemplary embodiments of the present invention, a second polarizer formed to overlap with only the surface of the second display panel is included to simplify a process and reduce a manufacturing cost.

DETAILED DESCRIPTION OF THE EMBODIMENTS

The present invention will be described more fully hereinafter with reference to the accompanying drawings, in which exemplary embodiments of the present invention are shown. As those skilled in the art may realize, the described embodiments may be modified in various different ways without departing from the spirit and scope of the present invention.

Figure 1:
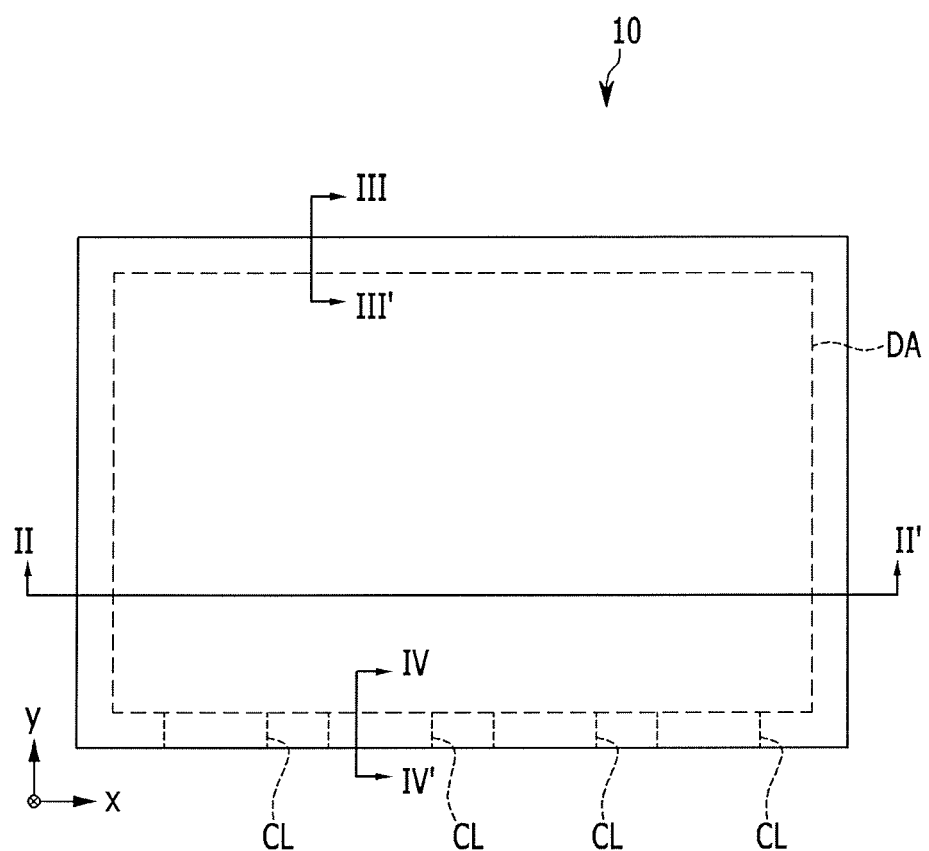
FIG. 1 is a layout view of a liquid crystal display according to an exemplary embodiment of the present invention.
Figure 2:
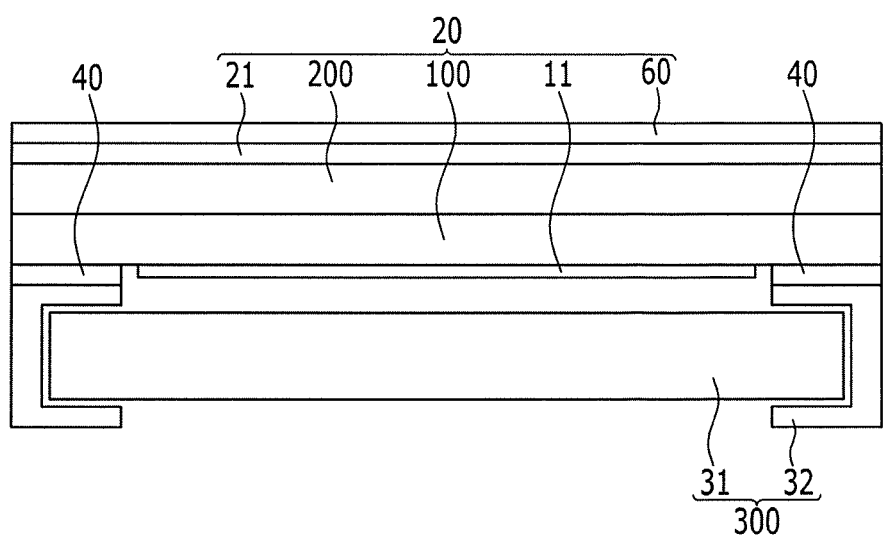
FIG. 2 is a cross-sectional view of the liquid crystal display of FIG. 1 taken along line II-II', according to an exemplary embodiment of the present invention.
Figure 3:
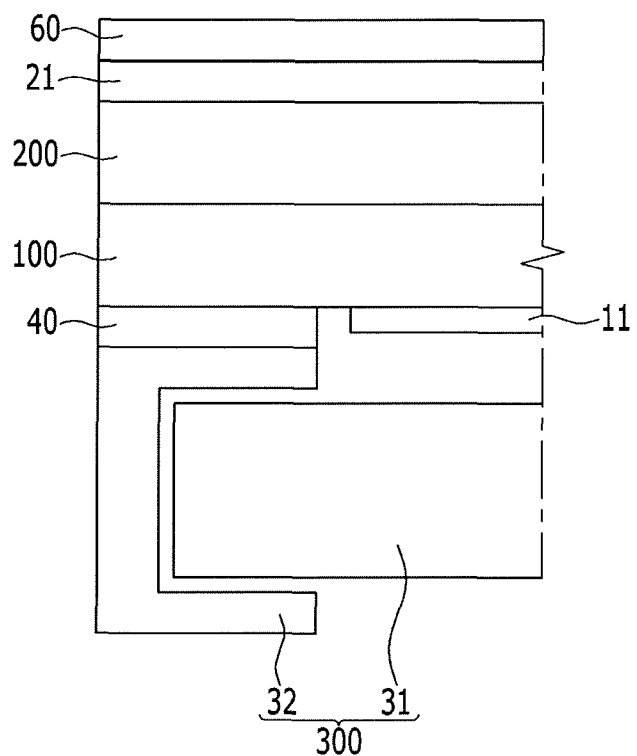
FIG. 3 is a cross-sectional view of the liquid crystal display of FIG. 1 taken along line III-III', according to an exemplary embodiment of the present invention.
Figure 4:
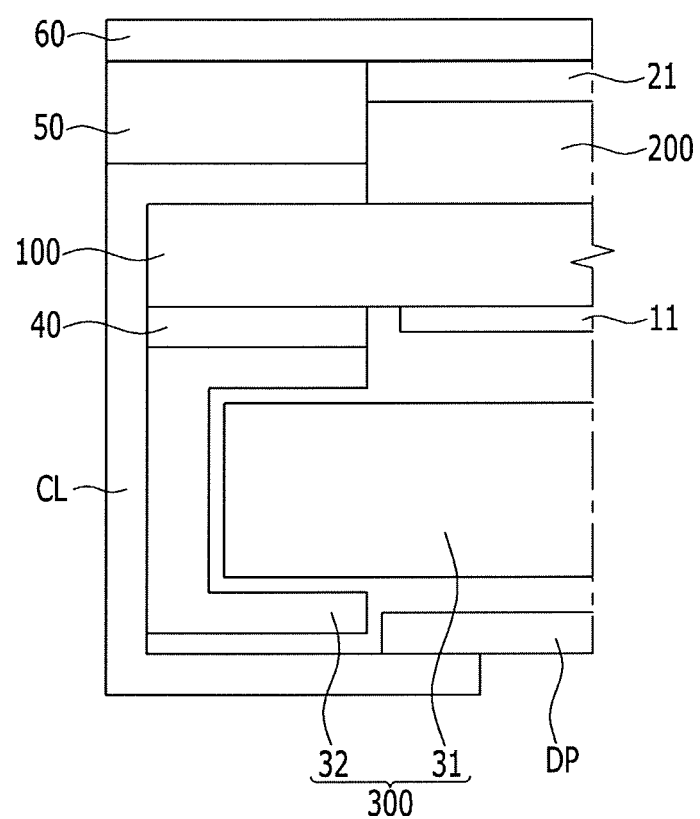
FIG. 4 is a cross-sectional view of the liquid crystal display of FIG. 1 taken along line IV-IV', according to an exemplary embodiment of the present invention.

In the drawings, the thicknesses of layers, films, panels, regions, etc., may be exaggerated for clarity. Like reference numerals may designate like elements throughout the specification. It will be understood that when an element such as a layer, film, region, or substrate is referred to as being "on" another element or "adjacent" to another element, it may be directly on or adjacent to the other element or intervening elements may also be present. A liquid crystal display, according to an exemplary embodiment of the present invention, may be described with reference to FIGS. 1 to 4. FIG. 1 is a layout view of a liquid crystal display according to an exemplary embodiment of the present invention. FIG. 2 is a cross-sectional view of the liquid crystal display of FIG. 1 taken along line II-II', according to an exemplary embodiment of the present invention. FIG. 3 is a cross-sectional view of the liquid crystal display of FIG. 1 taken along line III-III', according to an exemplary embodiment of the present invention. FIG. 4 is a cross-sectional view of the liquid crystal display of FIG. 1 taken along line IV-IV', according to an exemplary embodiment of the present invention.

Referring to FIGS. 1 to 4, a liquid crystal display 10, according to an exemplary embodiment of the present invention, may include a first display panel 100 and a second display panel 200 facing each other and coupled to each other. The liquid crystal display 10 may include a first polarizer 11 disposed on the first display panel 100, a second polarizer 21 disposed on the second display panel 200, and a reinforcing part 50 disposed on a surface of a portion of the first display panel 100 which does not overlap with the second display panel 200. The liquid crystal display 10 may include a liquid crystal panel 20, the liquid crystal panel 20 including the reinforcing part 50, a film layer 60 disposed on the surface of the second polarizer 21, the first and second display panels 100 and 200, the first polarizer 11, and the second polarizer 21. A backlight unit 300 may be disposed on a surface of the liquid crystal panel 20.

The backlight unit 300 may include a backlight assembly 31 and a mold frame 32 fixing the backlight assembly 31.

The liquid crystal panel 20 and the backlight unit 300 may be coupled (e.g., attached) with each other by an adhesive part 40.

Referring to FIG. 1, the liquid crystal panel 20 may include a first display panel 100 and a second display panel 200 facing each other and coupled with each other. The liquid crystal panel 20 may include a display area DA in which a plurality of pixels may be formed to display an image.

Referring to FIGS. 2 and 3, in an exemplary embodiment, the second polarizer 21 may extend up to both edge ends of the liquid crystal panel 20 in an X direction, and may not extend to both edges of the liquid crystal panel 20 in a Y direction. For example, the second polarizer 21 may extend on a portion of the liquid crystal panel 20 which overlaps with the mold frame 32 of the backlight unit 300 and the adhesive part 40.

The first polarizer 11, which may be disposed on the first display panel 100 adjacent to the backlight unit 300 of the first and second display panels 100 and 200 of the liquid crystal panel 20, might not be formed on a region where the adhesive part 40 is disposed. The second polarizer 21, which is disposed on the second display panel 200, may extend up to a region overlapping with the adhesive part 40, and may not overlap with the driver connecting line CL.

In an exemplary embodiment, the second display panel 200 does not overlap with an edge of the first display panel 100 where the driver connecting line CL is formed. For example, a width of the second display panel 200 along the Y direction may be smaller than a width of the first display panel 100 along the Y direction. The second display panel 200 may not overlap with a vicinity of the edge of the first display panel 100 where the driver connecting line CL is formed. Accordingly, an edge portion of the first display panel 100 may be exposed, and at least a part of the driver connecting line CL of the first display panel 100 is may be exposed on the exposed edge portion of the first display panel 100.

The second polarizer 21 may be disposed on the second display panel 200 and may overlap with the second display panel 200. The second polarizer 21 may not overlap with an edge portion of the first display panel 100 where the driver connecting line CL is disposed.

The reinforcing part 50 may be disposed on an edge portion of the first display panel 100 where the driver connecting line CL is disposed.

The reinforcing part 50 may compensate for a difference in height between a portion of the first display panel 100 where the driver connecting line CL is disposed and other components of the liquid crystal display 10 such as the second display panel 200, the second polarizer 21, or the film layer 60. For example, a step formed where the first display panel 100 does not overlap with the second display panel 200 may be compensated (e.g., filled) by the reinforcing part 50. Accordingly, a height of a surface (e.g., top surface) of the second polarizer 21, disposed on a surface of the second display panel 200, and a height of a surface (e.g., top surface) of the reinforcing part 50 may be substantially equal to each other.

According to an exemplary embodiment of the present invention, a thickness of the reinforcing part 50 may be about 0.5 mm to about 0.7 mm.

The film layer 60 may be disposed on the surfaces of the reinforcing part 50 and the second polarizer 21, and may cover substantially the entire surface of the liquid crystal display 10. For example, the film layer 60 may cover both the reinforcing part 50 and the second polarizer 21 to prevent a step between the reinforcing part 50 and the second polarizer 21 from being viewed by the user.

The film layer 60 may be a protective film. The thickness of the film layer 60 may be increased to prevent the step between the reinforcing part 50 and the second polarizer 21 from being viewed by the user. However, to produce a thin liquid crystal display, the thickness of the film layer 60 may be about 180 μm to about 250 μm.

In a liquid crystal display, according to an exemplary embodiment of the present invention, a chassis may not be disposed between the liquid crystal panel 20 and the backlight unit 300 which contact each other.

In a liquid crystal display, according to an exemplary embodiment of the present invention, after the backlight assembly 31 is fixed by the mold frame 32, the backlight assembly 31 is adhered to the liquid crystal panel 20 using the adhesive part 40. Thus, the liquid crystal panel 20 and the backlight unit 300 may be attached (e.g., adhered) to each other at four edges of the liquid crystal display 20 without using a top chassis. Thus, a thickness and a weight of the liquid crystal display may be reduced and a width of the bezel portion may be reduced.

In a liquid crystal display, according to an exemplary embodiment of the present invention, after the second polarizer 21 is formed on the surface of the second display panel 200, the reinforcing part 50 is formed between a portion of the first display panel 100 which does not overlap with the second display panel 200 to compensate for the elevation difference between the top surface of the first display panel 100 and the top surface of the second polarizer 21.

Figure 12:
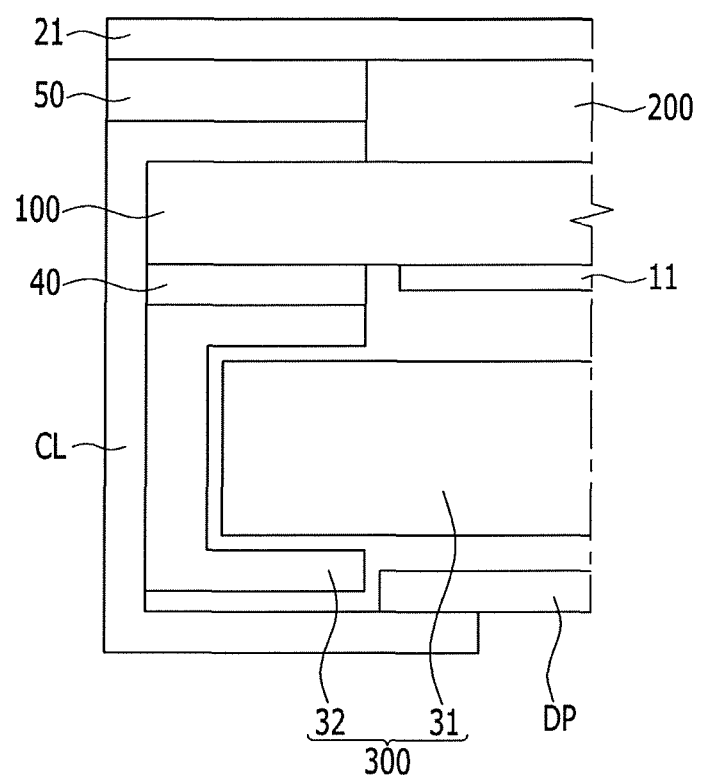
FIG. 12 is a cross-sectional view of the liquid crystal display illustrated in FIG. 1, taken along line IV-IV' in a liquid crystal display according to a comparative example.

FIG. 12 is a cross-sectional view taken along line IV-IV' in a liquid crystal display according to a comparative example of the present invention.

Referring to FIG. 12, the liquid crystal display according to the comparative example may include a reinforcing part 50 disposed on a portion of the first display panel 100 which does not overlap with the second display panel 200. A second polarizer 21 may be disposed on the second display panel 200 and the reinforcing part 50. As a result, in the liquid crystal display according to the comparative example, the reinforcing part 50 is formed at the portion of the first display panel 100 which does not overlap with the second display panel 200, and then the second polarizer 21 may be formed on the second display panel 200 and the reinforcing part 50.

In this case, since the second polarizer 21 is formed after the process of forming the reinforcing part 50, stains may be generated on a surface of the second display panel 200 when the process of forming the reinforcing part 50 is performed. Accordingly, in a liquid crystal display according to the comparative example, before forming the second polarizer 21 on the reinforcing part 50 and the second display panel 200, a process of cleaning the surfaces of the reinforcing part 50 and the second display panel 200 is required.

Figure 5:
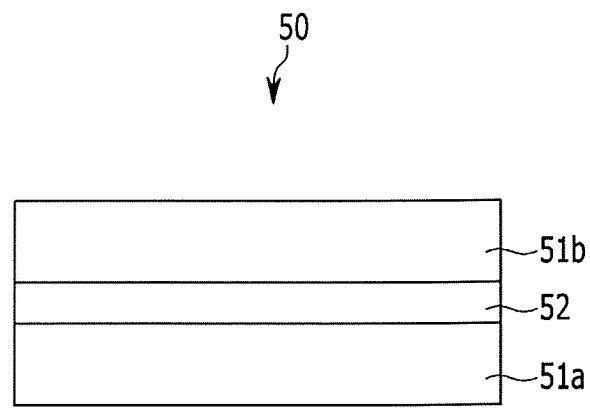
FIG. 5 is a cross-sectional view of a reinforcing part, according to an exemplary embodiment of the present invention.

However, as illustrated in FIG. 4, in a liquid crystal display according to an exemplary embodiment of the present invention, since the second polarizer 21 is formed to overlap with only the surface of the second display panel 200, the reinforcing part 50 may be formed after forming the second polarizer 21. Accordingly, in a liquid crystal display according to an exemplary embodiment of the present invention, a process of cleaning the surfaces of the reinforcing part 50 and the second display panel 200 before forming the second polarizer 21 may be omitted. Accordingly, a manufacturing process of a liquid crystal display 10 may be simplified and manufacturing costs of the liquid crystal display 10 may be reduced. A structure of the reinforcing part 50 of the liquid crystal display 10, according to an exemplary embodiment of the present invention, will be described in detail with reference to FIG. 5. FIG. 5 is a cross-sectional view of a reinforcing part, according to an exemplary embodiment of the present invention.

Referring to FIG. 5, a reinforcing part 50 of the liquid crystal display 10, according to an exemplary embodiment of the present invention, may include a first layer 51a, a second layer 51b, and an adhesive layer 52 for coupling the first layer 51a and the second layer 51b.

The first layer 51a and the second layer 51b may include synthetic resins such as polyethylene (PET).

At least one of the first layer 51a and the second layer 51b may include an elastic body (e.g., an elastic material). The elastic body of the first layer 51a or the second layer 51b may be included in at least a portion of a layer of the reinforcing part 50 (e.g., a portion of the first layer 51a or the second layer 51b). As a result of the elasticity of the reinforcing part 50, if a small height difference between a top surface of the reinforcing part 50 and a top surface of the second polarizer 21 exists, a surface (e.g., a top or a bottom surface) of the film layer 60 may be prevented from being lifted when the film layer 60 may be disposed on the top surface of the reinforcing part 50 and the top surface of the second polarizer 21. The reinforcing part 50 of the liquid crystal display 10, according to an exemplary embodiment of the present invention illustrated with reference to FIG. 5, may have a triple-layer structure including the first layer 51a, the second layer 51b, and the adhesive layer 52 for coupling the first layer 51a and the second layer 51b. However, a reinforcing part 50 of a liquid crystal display 10, according to an exemplary embodiment of the present invention, may have a single-layer structure, a double-layer structure, a quadruple-layer structure, or a structure including more than four layers.

Figure 6:
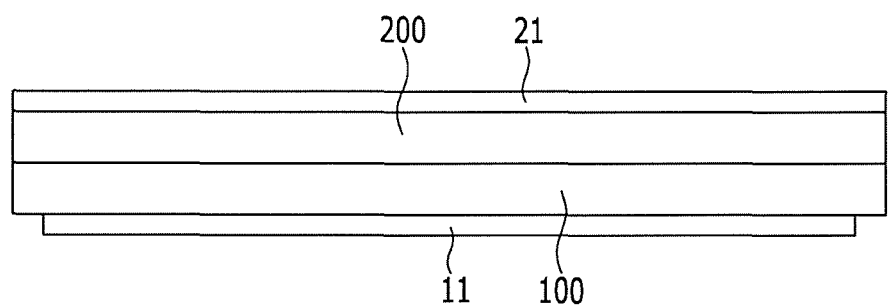
FIGS. 6 and 9 are cross-sectional views of the liquid crystal display illustrated in FIG. 1, taken along line II-II', illustrating a manufacturing method of a liquid crystal display according to an exemplary embodiment of the present invention.
Figure 7:
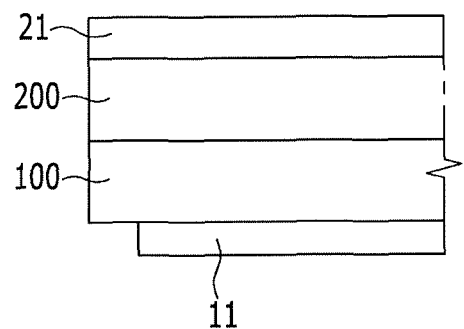
FIGS. 7 and 10 are cross-sectional views of the liquid crystal display illustrated in FIG. 1, taken along line III-III', illustrating a manufacturing method of a liquid crystal display according to an exemplary embodiment of the present invention.
Figure 8:
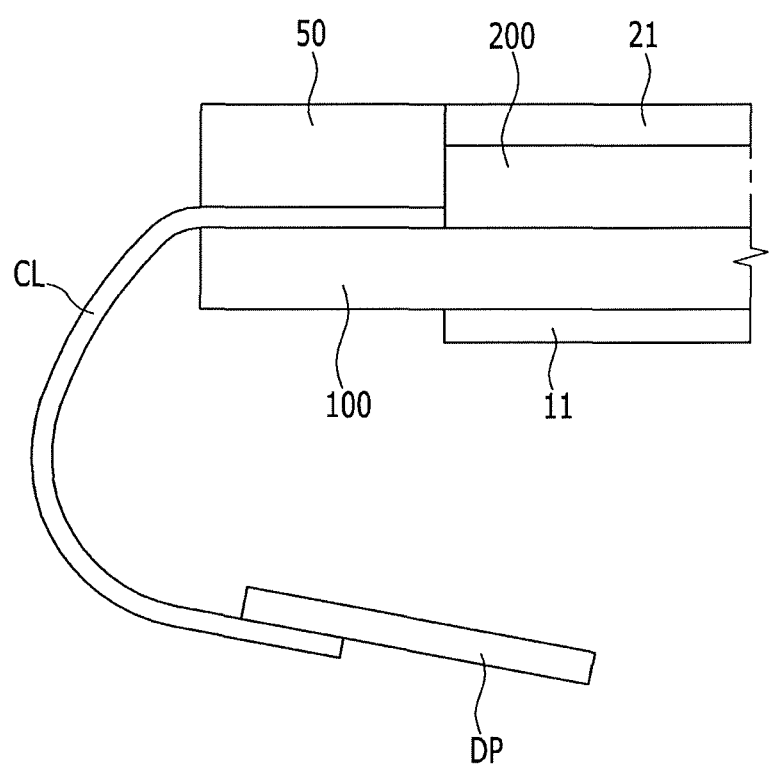
FIGS. 8 and 11 are cross-sectional views of the liquid crystal display illustrated in FIG. 1, taken along line IV-IV', illustrating a manufacturing method of a liquid crystal display according to the exemplary embodiment of the present invention.
Figure 9:
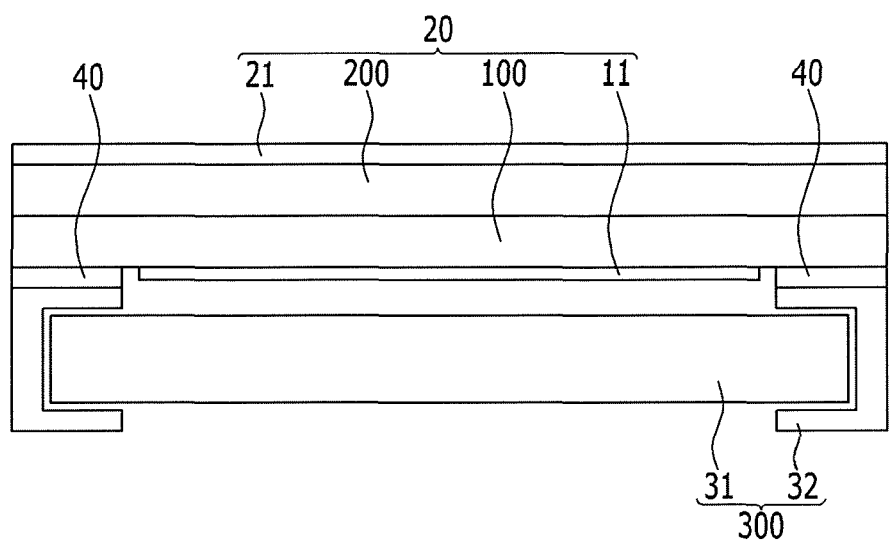
Figure 10:
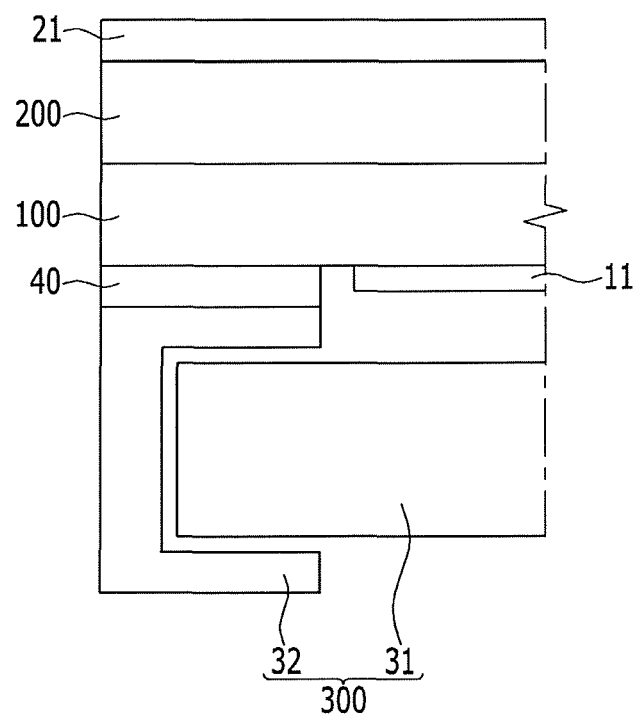
Figure 11:
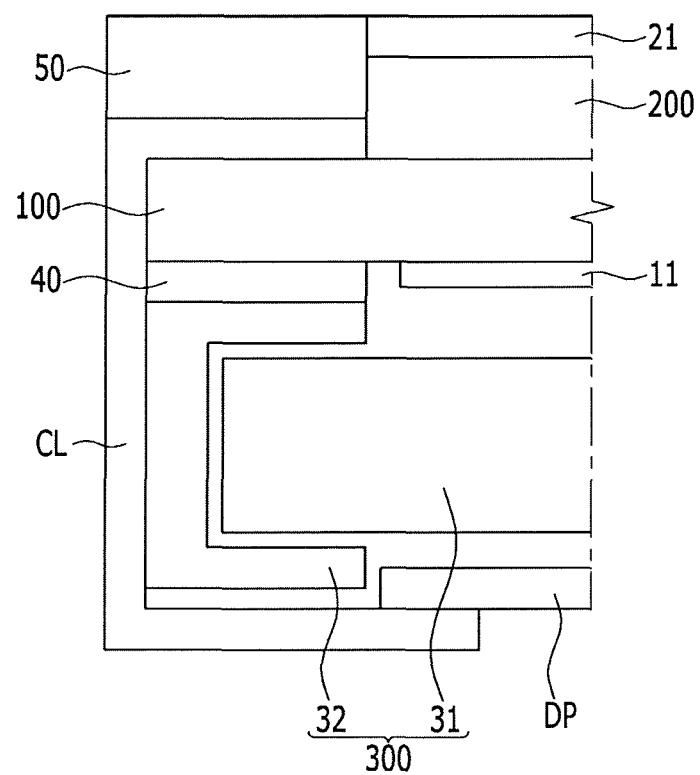

A manufacturing method of a liquid crystal display, according to an exemplary embodiment of the present invention, will be described with reference to FIGS. 6 to 11 and FIGS. 1 to 4. FIGS. 6 and 9 are cross-sectional views of the liquid crystal display 10 illustrated in FIG. 1, taken along line illustrating a manufacturing method of a liquid crystal display according to an exemplary embodiment of the present invention. FIGS. 7 and 10 are cross-sectional views of the liquid crystal display 10 illustrated in FIG. 1, taken along line illustrating a manufacturing method of a liquid crystal display according to an exemplary embodiment of the present invention. FIGS. 8 and 11 are cross-sectional views of the liquid crystal display illustrated in FIG. 1, taken along line IV-IV', illustrating a manufacturing method of a liquid crystal display according to an exemplary embodiment of the present invention.

As illustrated in FIGS. 6 to 8, the first display panel 100 including the driver connecting line CL and the second display panel 200 are formed, the first display panel 100 and the second display panel 200 face each other and are coupled to each other, and a liquid crystal layer is injected between the first display panel 100 and the second display panel 200. The first polarizer 11 is then attached to the first display panel 100, and the second polarizer 21 is attached to the second display panel 200. In a manufacturing method of the liquid crystal display, according to an exemplary embodiment of the present invention, the first polarizer 11 is attached after the first display panel 100 and the second display panel 200 are coupled to each other. However, exemplary embodiments of the present invention are not limited thereto.

For example, in a manufacturing method of a liquid crystal display according to an exemplary embodiment of the present invention, the first display panel 100 including the driver connecting line CL is formed, the first polarizer 11 is attached to the first display panel 100, the second polarizer 21 is attached to the second display panel 200, and then the first display panel 100 and the second display panel 200 may be coupled to each other. Various manufacturing sequences may be used to dispose the first polarizer 11 on the first display panel 100, to dispose the second polarizer 21 on the second display panel 200, and to couple the first display panel 100 with the second display panel 200. The first display panel 100 and the second display panel 200 may face each other. An external driving circuit part DP may be connected to the driver connecting line CL of the first display panel 100. The reinforcing part 50 may be disposed on the driver connecting line CL exposed (e.g., disposed) at one edge portion of the first display panel 100. In a manufacturing method of a liquid crystal display according to an exemplary embodiment, the reinforcing part 50 may be disposed on the driver connecting line CL after the driver connecting line CL and the driving circuit part DP are connected to each other. However, exemplary embodiments of the present invention are not limited thereto.

For example, in a manufacturing method of a liquid crystal display according to an exemplary embodiment of the present invention, after the reinforcing part 50 is formed on the driver connecting line CL exposed outside at one edge of the first display panel 100, the external driving circuit part DP may be connected with the driver connecting line CL.

As illustrated in FIGS. 9 to 11, the backlight unit 300 and the first display panel 100 may be attached to each other using the adhesive part 40. In a manufacturing method of a liquid crystal display according to an exemplary embodiment of the present invention, the reinforcing part 50 may be disposed on the first display panel 100 before the backlight unit 300 and the first display panel 100 are attached to each other using the adhesive part 40. However, exemplary embodiments of the present invention are not limited thereto.

For example, in the manufacturing method of a liquid crystal display according to an exemplary embodiment of the present invention, the reinforcing part 50 may be formed after the backlight unit 300 and the first display panel 100 are attached to each other using the adhesive part 40.

In a manufacturing method of the liquid crystal display according to an exemplary embodiment of the present invention, the process of forming the second polarizer 21 to overlap with only a surface of the second display panel 200 is performed. As a result, after the process of forming the second polarizer 21, the process of forming the reinforcing part may be performed. Accordingly, in a manufacturing method of a liquid crystal display according to an exemplary embodiment of the present invention, the process of cleaning the surfaces of the reinforcing part 50 and the second display panel 200 may be omitted before the process of forming the second polarizer 21. Accordingly, a manufacturing process of the liquid crystal display 10 may be simplified, and the manufacturing cost of the liquid crystal display 10 may be reduced.

As illustrated in FIGS. 1 to 4, the film layer 60 may be disposed on the second polarizer 21 and the reinforcing part 50. As a result, the film layer 60 may be disposed on the entire surface of the liquid crystal display 10.

In a manufacturing method of a liquid crystal display according to an exemplary embodiment of the present invention, the second polarizer 21 is formed on the second display panel 200, the reinforcing part 50 is formed at a position overlapping with the driver connecting line CL formed on the first display panel 100, and then the film layer 60 may be formed on the entire surface of the liquid crystal display 10 by attaching the film layer 60 to the second polarizer 21 and the reinforcing part 50. Therefore, the bezel portion of the liquid crystal display 10, at four edges of the liquid crystal display 10, may be substantially hidden from a user of the liquid crystal display 10.

While the present invention has been described with reference to exemplary embodiments thereof, it is to be understood that the present invention is not limited to the disclosed exemplary embodiments. The present invention may include various modifications and arrangements of the disclosed exemplary embodiments that fall within the spirit and scope of the present invention as defined by the following claims.

What is claimed is:

1. A liquid crystal display, comprising:
a first display panel and a second display panel facing each other;
a driver connecting line disposed on the first display panel;
a driving circuit part connected to the driver connecting line;
a backlight unit attached to the first display panel by an adhesive part;
a reinforcing part overlapping the driver connecting line and disposed adjacent to at least one side of the second display panel;
a second polarizer disposed on the second display panel, wherein the second polarizer overlaps a top surface of the second display panel and does not overlap a top surface of the reinforcing part; and
a film layer disposed on the second polarizer and the reinforcing part,
wherein the reinforcing part includes a first layer, a second layer and an adhesive layer disposed between the first and second layers,
at least one of the first and second layers comprises an elastic material,
the backlight unit comprises a backlight assembly and a mold frame supporting the backlight assembly,
the mold frame and the first display panel are attached to each other by the adhesive part, and
the reinforcing part overlaps the adhesive part.

2. The liquid crystal display of claim 1, wherein
an end portion of the driver connecting line does not overlap the second display panel, and
the reinforcing part overlaps the driver connecting line.

3. The liquid crystal display of claim 1, wherein
a surface height of the reinforcing part and a surface height of the second polarizer are substantially equal to each other.

4. The liquid crystal display of claim 1, wherein
a chassis is not disposed between the backlight unit and the first display panel.

5. The liquid crystal display of claim 1, wherein the second polarizer overlaps the top surface of the second display panel and does not overlap the reinforcing part.

6. A manufacturing method of a liquid crystal display, comprising:
forming a first display panel and a second display panel facing the first display panel,
wherein forming the first display panel comprises disposing a signal line on a pixel region of the first display panel, connecting a driver connecting line to the signal line, and connecting a driving circuit part to the driver connecting line;
forming a first polarizer on a first surface of the first display panel and a second polarizer on a second surface of the second display panel;
adhering the first display panel and a backlight unit to each other using an adhesive part;
forming a reinforcing part to overlap with the driver connecting line, the reinforcing part being adjacent to at least one side of the second display panel,
wherein the reinforcing part is formed after the second polarizer is formed; and
forming a film layer on the second polarizer and the reinforcing part,
wherein the reinforcing part includes a first layer, a second layer and an adhesive layer disposed between the first and second layers,
at least one of the first and second layers comprises an elastic material,
the backlight unit comprises a backlight assembly and a mold frame supporting the backlight assembly,
the mold frame and the first display panel are attached to each other by the adhesive part, and
the reinforcing part overlaps the adhesive part.

7. The manufacturing method of claim 6, wherein a portion of the driver connecting line does not overlap with the second display panel, and the reinforcing part overlaps with the driver connecting line.

8. The manufacturing method of claim 6, wherein a surface height of the reinforcing part and a surface height of the second polarizer are substantially equal to each other.

9. The manufacturing method of claim 6, wherein the second polarizer overlaps the second surface of the second display panel and does not overlap a top surface of the reinforcing part.

10. A liquid crystal display, comprising:
a first panel and a second panel facing the first panel;
a first polarizer disposed under the first panel;
a second polarizer disposed on the second panel;
a reinforcing part disposed on the first panel, the reinforcing part not overlapping with the second polarizer;
a driver connecting line disposed on the first panel, the driver connecting line overlapping with the reinforcing part;
a driving circuit part connected with the driver connecting line;
a backlight unit attached to the first panel by an adhesive part; and
a film layer disposed on the second polarizer,
wherein the reinforcing part includes a first layer, a second layer and an adhesive layer disposed between the first and second layers,
at least one of the first and second layers comprises an elastic material,
the backlight unit comprises a backlight assembly and a mold frame supporting the backlight assembly,
the mold frame and the first display panel are attached to each other by the adhesive part, and
the reinforcing part overlaps the adhesive part.

11. The liquid crystal display of claim 10, wherein at least one of the first and second layers includes polyethylene (PET).

12. The liquid crystal display of claim 10, wherein a thickness of the reinforcing part is about 0.5 mm to about 0.7 mm.

13. The liquid crystal display of claim 10, wherein a first width of the second panel along a first direction is smaller than a first width of the first panel along the first direction, and a second width of the second panel along a second direction crossing the first direction is substantially equal to a second width of the first panel along the second direction.

14. The liquid crystal display of claim 10, wherein a first height of a top surface of the reinforcing part is substantially equal to a second height of a top surface of the second polarizer.

15. The liquid crystal display of claim 10, wherein the backlight unit is fastened to the first panel via an adhesive part, and wherein the first polarizer does not overlap with the adhesive part.

16. The liquid crystal display of claim 10, wherein the film layer overlaps with the reinforcing part and the second polarizer.

17. The liquid crystal display of claim 10, wherein the film layer hides a step between the reinforcing part and the second polarizer.

18. The liquid crystal display panel of claim 10, wherein
an end portion of the driver connecting line is substantially aligned with an end portion of the reinforcing part,
one side of the second polarizer is substantially aligned with the one side of the second panel, and
the end portion of the reinforcing part contacts the one side of the second panel and the one side of the second polarizer.

19. The liquid crystal display of claim 1, wherein
an end portion of the driver connecting line is substantially aligned with an end portion of the reinforcing part,
one side of the second polarizer is substantially aligned with the one side of the second display panel, and
the end portion of the reinforcing part contacts the one side of the second display panel and the one side of the second polarizer.

20. The manufacturing method of claim 6, wherein
an end portion of the driver connecting line contacts the one side of the second display panel,
the end portion of the driver connecting line is substantially aligned with an end portion of the reinforcing part,
one side of the second polarizer is substantially aligned with the one side of the second display panel, and
the end portion of the reinforcing part contacts the one side of the second display panel and the one side of the second polarizer.

* * * * *